United States Patent
Kumura (10) Patent No.: US 6,792,442 B1
(45) Date of Patent: *Sep. 14, 2004

(54) SIGNAL PROCESSOR AND PRODUCT-SUM OPERATING DEVICE FOR USE THEREIN WITH ROUNDING FUNCTION

(75) Inventor: Takahiro Kumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,749

(22) PCT Filed: Feb. 3, 2000

(86) PCT No.: PCT/JP00/00584

§ 371 (c)(1),
(2), (4) Date: Aug. 2, 2001

(87) PCT Pub. No.: WO00/46692

PCT Pub. Date: Aug. 10, 2000

(30) Foreign Application Priority Data

Feb. 3, 1999 (JP) .......................................... 11-025674

(51) Int. Cl.[7] ................................................ G06F 7/38
(52) U.S. Cl. ........................ 708/523; 708/550; 708/603
(58) Field of Search ............................... 708/490, 523, 708/550, 551, 501, 496, 497, 603

(56) References Cited

U.S. PATENT DOCUMENTS

| | | | | |
|---|---|---|---|---|
| 4,876,660 A | * | 10/1989 | Owen et al. ............... | 708/603 |
| 5,363,322 A | * | 11/1994 | Gergen et al. ............. | 708/620 |
| 5,862,067 A | * | 1/1999 | Mennemeier et al. ....... | 708/501 |

FOREIGN PATENT DOCUMENTS

| | | |
|---|---|---|
| JP | 59-197936 | 9/1984 |
| JP | 5-020352 | 1/1993 |
| JP | 7-56712 | 3/1995 |
| JP | 8-137669 | 5/1996 |
| JP | 9-274612 | 10/1997 |
| JP | 10-134032 | 5/1998 |

* cited by examiner

*Primary Examiner*—Chuong Dinh Ngo
(74) *Attorney, Agent, or Firm*—Dickstein, Shapiro, Morin & Oshinsky, LLP (57) ABSTRACT

An object of the present invention is to provide a multiply-accumulate unit with a rounding function which is capable of effecting 16-bit multiply-accumulate operations taking into account the position of an addend in a register. The multiply-accumulate unit with the rounding function has a selection inputting and expanding means 42 for expanding an addend from 31st–16th bits of 40-bit register 1 into 40-bit data and transmitting the 40-bit data to MAC (multiply-accumulate) unit 41 if control signal Position from an external source is "1", and expanding an addend from 15th–0th bits of 40-bit register 1 into 40-bit data and transmitting the 40-bit data to MAC unit 41 if control signal Position is "0". MAC unit 41 performs a multiply-accumulate operation on the 40-bit data, 16-bit data multiplicand B, and multiplier C. Rounding and selection outputting means 43 rounds off the result of the multiply-accumulation operation into 16-bit data if control signal Round from an external source is "1", and outputs the rounded data to the position of the addend in the 40-bit register 1, where the position is indicated by control signal Position.

16 Claims, 7 Drawing Sheets

| CONTROL SIGNAL | | OUTPUT |
|---|---|---|
| Round | Position | |
| 0 | 0 | OUTPUT 39TH-0TH BITS OF REGISTER 1 WITHOUT CHANGE |
| 0 | 1 | |
| 1 | 0 | EXPAND 15TH-0TH BITS OF REGISTER 1 INTO 40-BIT DATA |
| 1 | 1 | EXPAND 31ST-16TH BITS OF REGISTER 1 INTO 40-BIT DATA |

Fig. 6

| CONTROL SIGNAL | | OUTPUT | | | REMARKS |
|---|---|---|---|---|---|
| Round | Position | OUTPUT 47E | OUTPUT 47H | OUTPUT 47L | |
| 0 | 0 | 39TH-32ND BITS OF INPUT DATA 49 | 31ST-16TH BITS OF INPUT DATA 49 | 15TH-0TH BITS OF INPUT DATA 49 | OUTPUT INPUT DATA 49 WITHOUT ROUNDING PROCESS |
| 0 | 1 | | | | |
| 1 | 0 | NO OUTPUT | NO OUTPUT | 16 BITS DATA MADE FROM ROUNDING PROCESS OF INPUT DATA 49 | ROUND INPUT DATA 49 AND OUTPUT TO 15TH-0TH BITS OF REGISTER 1 |
| 1 | 1 | NO OUTPUT | 16 BITS DATA MADE FROM ROUNDING PROCESS OF INPUT DATA 49 | NO OUTPUT | ROUND INPUT DATA 49 AND OUTPUT TO 31ST-16TH BITS OF REGISTER 1 |

Fig. 7

SIGNAL PROCESSOR AND PRODUCT-SUM OPERATING DEVICE FOR USE THEREIN WITH ROUNDING FUNCTION

TECHNICAL FIELD

The present invention relates to a signal processor and a multiply-accumulate unit with a rounding function for use in such a signal processor.

BACKGROUND ART

Signal processors read data from memory and process the read data in various ways, i.e., processes of addition, subtraction, logical operation, and multiplication. The processing capability of signal processors are highly increased by incorporating a multiply-accumulate unit which can execute, in one processor cycle, multiply-accumulate operations that frequently appear in signal processing program such as image processing, sound processing, or the like.

Figure 1:
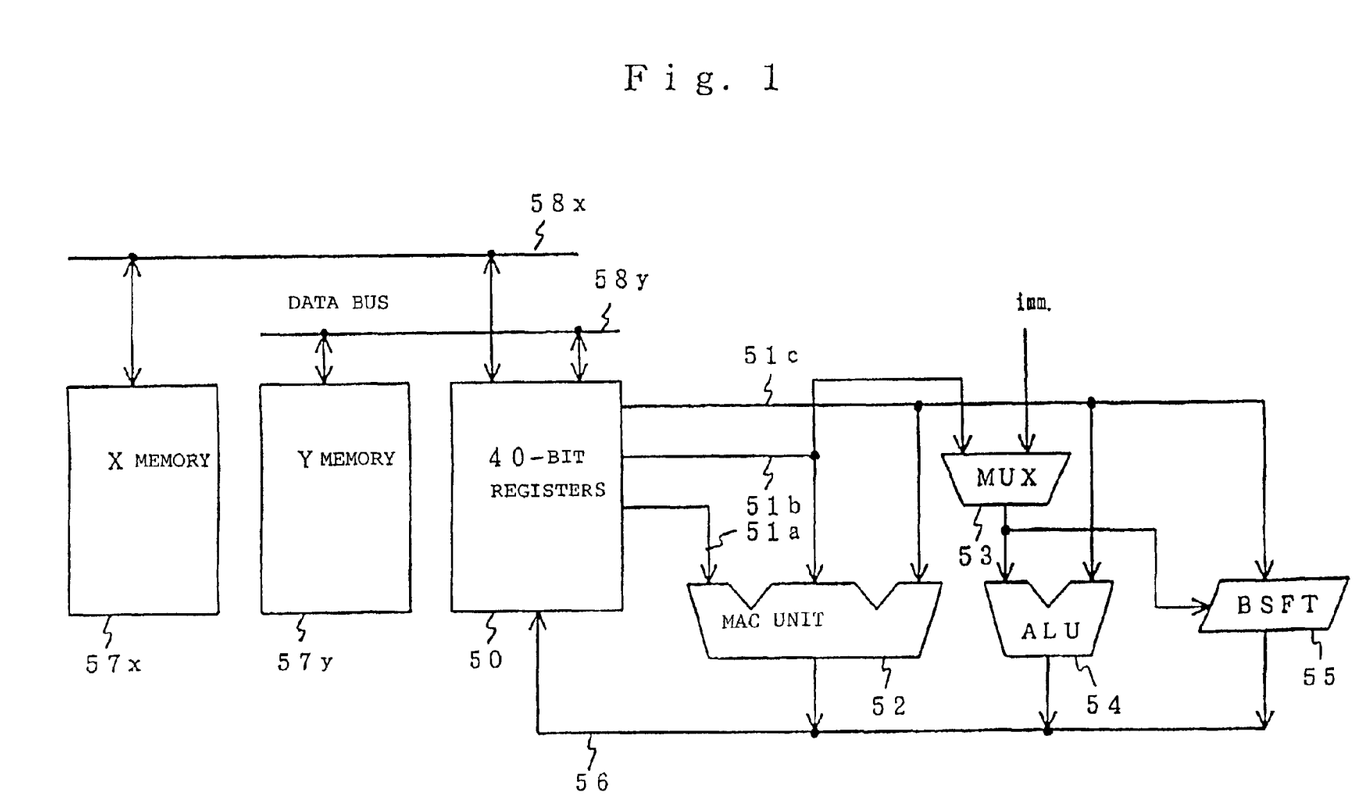
FIG. 1 is a block diagram of a conventional signal processor.

FIG. 1 of the accompanying drawings shows a conventional signal processor having several execution units, registers, and memory. The signal processor shown in FIG. 1 is introduced in "IEEE VLSI SIGNAL PROCESSING, VI", pp. 93–101, 1993.

As shown in FIG. 1, the conventional signal processor has eight 40-bit registers hereinafter referred to as "registers 50"), MAC (multiply-accumulate) unit 52, MUX (multiplexer) 53, ALU (arithmetic and logical unit) 54, BSFT (barrel shift unit) 55, X memory 57x, and Y memory 57y. X memory 57x and Y memory 57y are hereinafter referred to as memory 57x and memory 57y, respectively.

Memory 57x and memory 57y are connected to registers 50 by respective data buses 58x, 58y. MAC unit 52, ALU 54, MUX 53, and BSFT 55 are connected to output lines 51a, 51b, and 51c from registers 50.

MAC unit 52 carries out multiply-accumulate operations. ALU 54 carries out an arithmetic or logical operation using an immediate value imm. selected by MUX 53 or a value from registers 50. BSFT 55 carries out an arithmetic or logical shift using an immediate value imm. selected by MUX 53 or a value from registers 50.

Multiply-accumulate operations that frequently appear in signal processing program are operations to perform a multiplication and an accumulation according to the following equation (1):

$$A = A + B \times C \qquad (1)$$

Specifically, the product of multiplicand B and multiplier C is added to addend A on the right side of the equation (1), and the sum is placed on the left side A of the equation (1). In most cases, addend A on the right side of the equation (1) is the result of multiply-accumulate operations that are frequently performed, while it may be read from memory in some cases. Operations that are represented by the equation (1) where the symbol "+" on the right side of the equation (1) is replaced with the symbol "−" are also referred to as multiply-accumulate operations.

In general multiply-accumulate units which deal with fixed-point numerical data, multiplicand B and multiplier C on the right side of the equation (1) are usually expressed in 16-bit wide because of practical and economical reasons. Since the product of multiplicand B and multiplier C becomes 32-bit wide at maximum, each of addend A on the right side of the equation (1) and the sum A on the left side of the equation (1) need to be expressed in 32-bit wide or more.

For the above reason, general signal processors have 32-bit registers or more to save the results of multiply-accumulate operations. When two 16-bit data are held in one register of such a signal processor, they are placed in 15th–0th bits or 31st–16th bits of the register.

Figure 2:
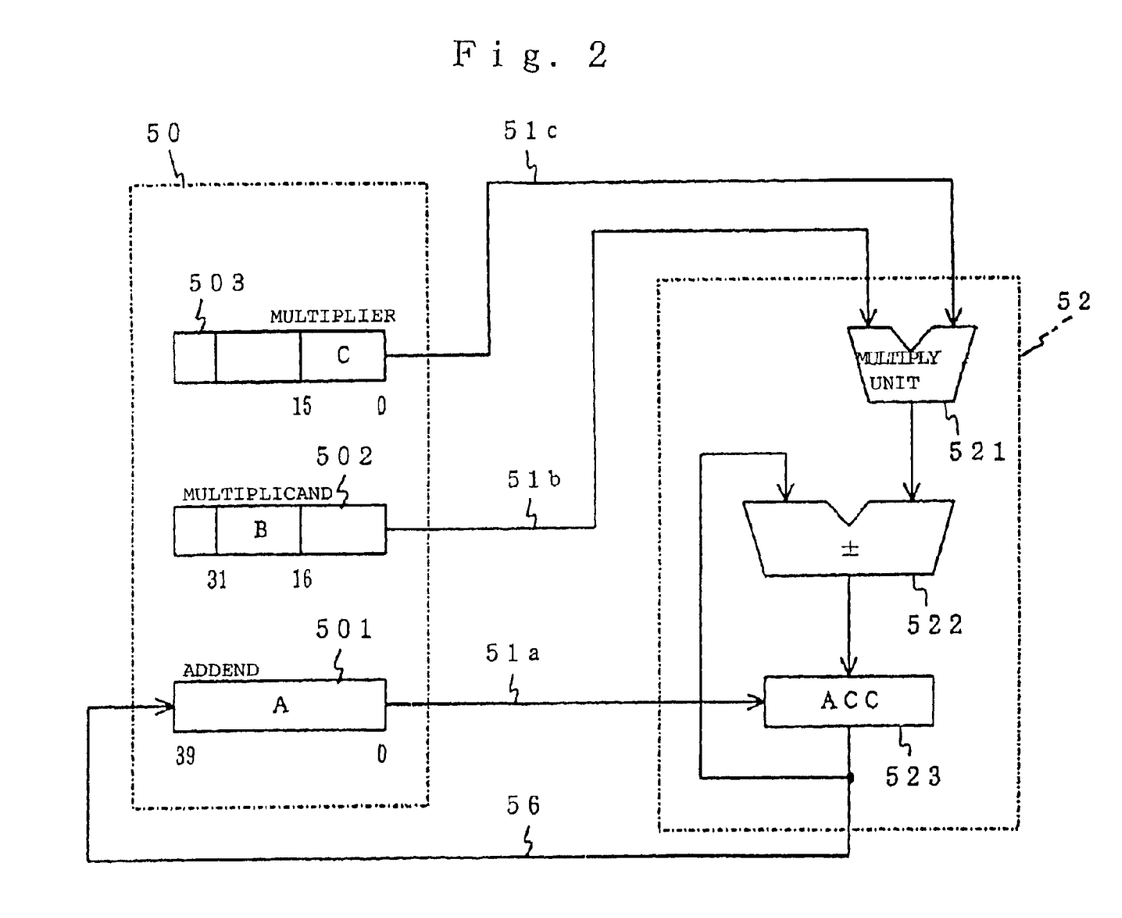
FIG. 2 is a block diagram showing a sequence of performing a multiply-accumulate operation on an addend of 40-bit data, a multiplicand and a multiplier, each of 16-bit data, with the conventional signal processor.

Let us describe the multiply-accumulate operation according to the equation (1) which is carried out by the conventional signal processor shown in FIG. 1 with reference to FIG. 2 of the accompanying drawings. FIG. 2 shows a sequence to perform a multiply-accumulate operation with registers 50 and MAC unit 52 of the conventional signal processor shown in FIG. 1.

Multiplicand B, multiplier C, and addend A on the right side of the equation (1) are read from memory connected to the signal processor into register 502, register 503, and register 501, respectively.

Multiplicand B and multiplier C may be placed in either 31st–16th bits or 15th–0th bits of registers 502, 503. It is assumed here that multiplicand B is placed in 31st–16th bits of register 502 and multiplier C is placed in 15th–0th bits of register 503. Addend A is placed in all the bits of register 501. In FIG. 2, numerals shown beneath registers 501, 502, 503 indicate bit positions therein.

Then, addend A is stored in ACC (accumulator) 523 of MAC unit 52. Multiplicand B and multiplier C are supplied to multiply unit 521 in MAC unit 52, which calculates the product of multiplicand B and multiplier C. The calculated product of multiplicand B and multiplier C is added to addend A from ACC 523 by adder/subtractor (±) 522. The sum produced by adder/subtractor 522 is temporarily stored in ACC 523, and written back via output line 56 into register 501 which has stored addend A.

Now, let us consider a process of reading an addend as 16-bit data from memory, performing a certain multiply-accumulate operation on the added, and saving the result as 16-bit data in memory on the conventional signal processor shown in FIG. 1. In the process, all input and output data are 16-bit wide regardless of interim data sizes.

The above process occurs when the multiplicand or multiplier in a multiply-accumulate operation is used as the addend in another multiply-accumulate operation. In this process, since all the addend, the multiplicand, and the multiplier are 16-bit wide, the result may possibly cause an overflow depending on the values of the addend, the multiplicand, and the multiplier. However, the multiply-accumulate operation can be performed without an overflow if the addend, the multiplicand, and the multiplier are arranged in a suitable range.

Figure 3:
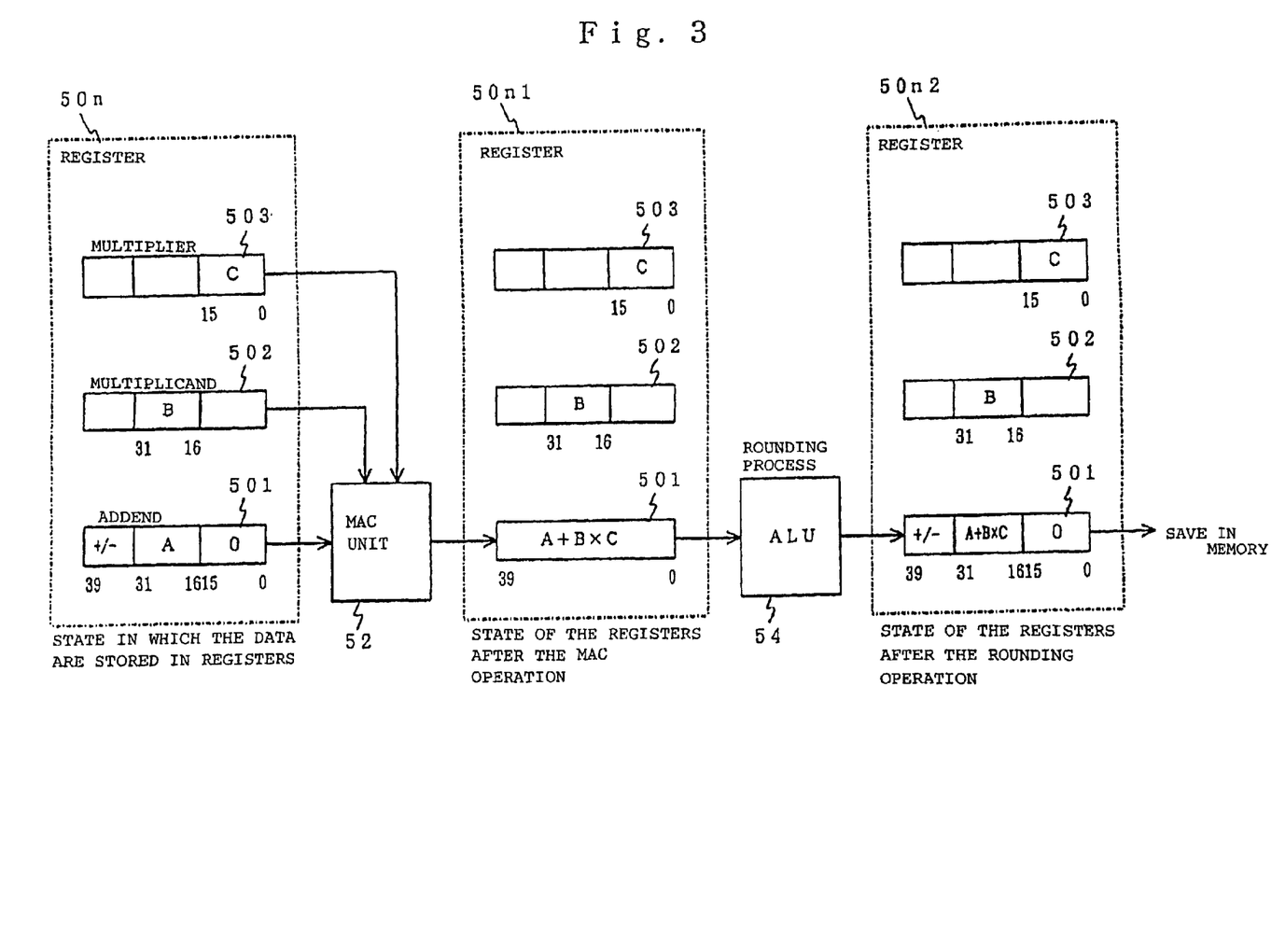
FIG. 3 is a block diagram showing registers states in a sequence of performing a multiply-accumulate operation on an addend, a multiplicand, and a multiplier, each of 16-bit data, with the conventional signal processor.

Let us describe the multiply-accumulate operation in the above process on the conventional signal processor shown in FIG. 1 with reference to FIG. 3 of the accompanying drawings. In FIG. 3, multiplicand B, multiplier C, and addend A are read from memory connected to the signal processor into 31st–16th bits of register 502, 15th–0th bits of register 503, and 31st–16th bits of register 501, respectively.

When addend A expressed as fixed-point 16-bit data is read into register 501, the sign of addend A is inserted into 39th–32nd bits, addend A into 31st–16th bits, and "0" into 15th–0th bits. A state in which the data are stored in registers 501, 502, 503 is referred to as state 50n. A state of the registers after the multiply-accumulate operation is referred to as state 50n1. A state of the registers after the result is rounded off is referred to as state 50n2.

In state 50n1 which follows state 50n, the result A+B×C is stored in register 501. In state 50n2, the result of the multiply-accumulate operation, which is 40-bit wide, is rounded off into 16 bits by ALU 54, and the rounded result is stored in register 501. Finally, the rounded result is stored in memory.

There are two problems in the above processing sequence. The first problem is that the data size of addend A read from memory and the data size of an addend required by MAC unit 52 are different from each other. Since addend A is 16-bit data, it has to be expanded into 40-bit data for multiply-accumulate operations. Therefore, two 16-bit addends cannot be placed in one register.

The second problem is that the data size of the result of the calculation performed by the MAC unit and the data size of the result when it is stored in memory are different from each other. Because the MAC unit of the conventional signal processor outputs a 40-bit result, when it is to be stored as 16-bit data into memory, the 40 bits need to be rounded off into 16 bits. Consequently, a rounding process has to be carried out in addition to the multiply-accumulate operation.

If the bus size between memory and the register is increased to 32 bits in order to improve performance of the conventional signal processor, then two 16-bit data can simultaneously be read through each data bus.

Let us analyze multiply-accumulate operations with 16-bit input and output data on such a signal processor. Since each of the multiplicand and the multiplier is expressed as 16-bit data, the signal processor can simultaneously read both the multiplicand and the multiplier by exploiting its 32-bit data transfer capability. The read two 16-bit data are stored respectively in 31st–16th bits and 15th–0th bits of a register.

Similarly, two addends may simultaneously be read into a register by exploiting the 32-bit data transfer capability. However, the reading process does not work well because these two addends are placed in one register in spite of the fact that each of these addends must be placed in 31st–16th bits of an individual register, and that 15th–0th bits of the register must be filled with "0" for following multiply-accumulate operations.

Specifically, if two addends are stored in 31st–16th bits and 15th–0th bits of a register, then no correct operation can be performed. Consequently, addends need to be read, one at a time, into a register.

If two addends are read into one register, then they have to be moved into distinct registers by means of register-to-register transfer or shift operations. In this case, even though the number of load instructions to read two addends from memory may be reduced to half, the total number of instructions in terms of reading two addends cannot be reduced to half because extra data transfer instructions are required to separate two addends within one register. This means that the 32-bit data transfer capability between registers and memory cannot substantially be exploited.

As described above, the conventional signal processor suffers from some problems with regard to the handling of 16-bit addends. One of problems is that excess resources are occupied in multiply-accumulate operations where all inputs and outputs are 16-bit wide. A 16-bit addend must be placed into a register with expanded to the width of the register in an appropriate manner in order to match the data size required by the MAC unit.

Furthermore, since results of multiply-accumulate operations have the same data size as the size of registers, they need to be rounded off into 16-bit data in order to be stored into memory. This problem causes another problem in which the efficiency of data transfer between memory and the register cannot be increased.

For example, even if data bus widths between registers and memory in FIG. 1 are doubled to 32 bits so as to be able to read one 32-bit data or two 16-bit data through each data bus, it is indispensable to transfer addend data between registers in order to read two 16-bit addends simultaneously into registers through the doubled data bus and to efficiently process those 16-bit addends. Consequently, the efficiency of data transfer between registers and memory, which is required until the operations are carried out, cannot be increased.

DISCLOSURE OF THE INVENTION

An object of the present invention, therefore, is to provide a signal processor which can solve the above problems and efficiently handle 16-bit addends, or to provide a multiply-accumulate unit with a rounding function for use in such a signal processor. A more specific object of the present invention is to provide a signal processor which is able to execute efficiently 16-bit multiply-accumulate operations taking into account the position of an addend in a register, or to provide a multiply-accumulate unit with a rounding function for use in such a signal processor.

A signal processor based on the present invention includes a multiply-accumulate unit with a rounding function, which performs a multiply-accumulate operation on an addend, a multiplicand, and a multiplier. The signal processor has a number of registers connected to the multiply-accumulate unit with the rounding function. The multiply-accumulate unit with the rounding function comprises selecting inputting means for entering an addend supplied selectively from different positions in one of said registers, rounding means for performing a rounding process to convert data of a larger data size into data of a smaller data size on the result of the multiply-accumulate operation where the addend is selectively entered by said selecting inputting means, and selection outputting means for outputting the result of the multiply-accumulate operation rounded by said rounding means selectively to different positions in one of said registers.

A multiply-accumulate unit with a rounding function based on the present invention includes a multiply-accumulate unit for performing a multiply-accumulate operation on an addend, a multiplicand, and a multiplier. The multiply-accumulate unit with the rounding function works together with a number of registers connected to the unit, and comprises selecting inputting means for entering an addend supplied selectively from different positions in one of said registers which is connected externally thereto, rounding means for performing a rounding process to convert data of a larger data size into data of a smaller data size on the result of the multiply-accumulate operation based on the addend selectively entered by said selecting inputting means, and selection outputting means for outputting the result of the multiply-accumulate operation rounded by said rounding means selectively to different positions in one of said registers.

Specifically, the multiply-accumulate unit with the rounding function based on the present invention has a selection inputting and expanding means, a rounding and selection outputting means, and a multiply-accumulate unit. The multiply-accumulate unit with the rounding function has its operation mode which is controlled by two kinds of signals Round, Position. If control signal Round is "0", then the multiply-accumulate unit with the rounding function based on the present invention operates as the conventional multiply-accumulate unit.

If control signal Round is "1", the multiply-accumulate unit with the rounding function based on the present invention operates differently depending on control signal Position. In this case, the selection inputting and expanding means expands an addend into a data which has the data size required by the multiply-accumulate unit based on the control signal Position which indicates the position of the addend represented by 16-bit wide data in the externally connected register.

The rounding and selection outputting means rounds off the result of the multiply-accumulate operation whose data size corresponds to the data size of the register into 16-bit data, and then outputs the rounded data to the position of the addend in the register which is indicated by control signal Position.

With the above arrangement, it is possible to perform multiply-accumulate operations with the rounding operation on each 16-bit addend placed in 31st–16th bits or 15th–0th bits of registers, which are 32-bit wide or more and are connected to the multiply-accumulate unit with the rounding function, without affecting other bits.

BEST MODE FOR CARRYING OUT THE INVENTION

Figure 4:
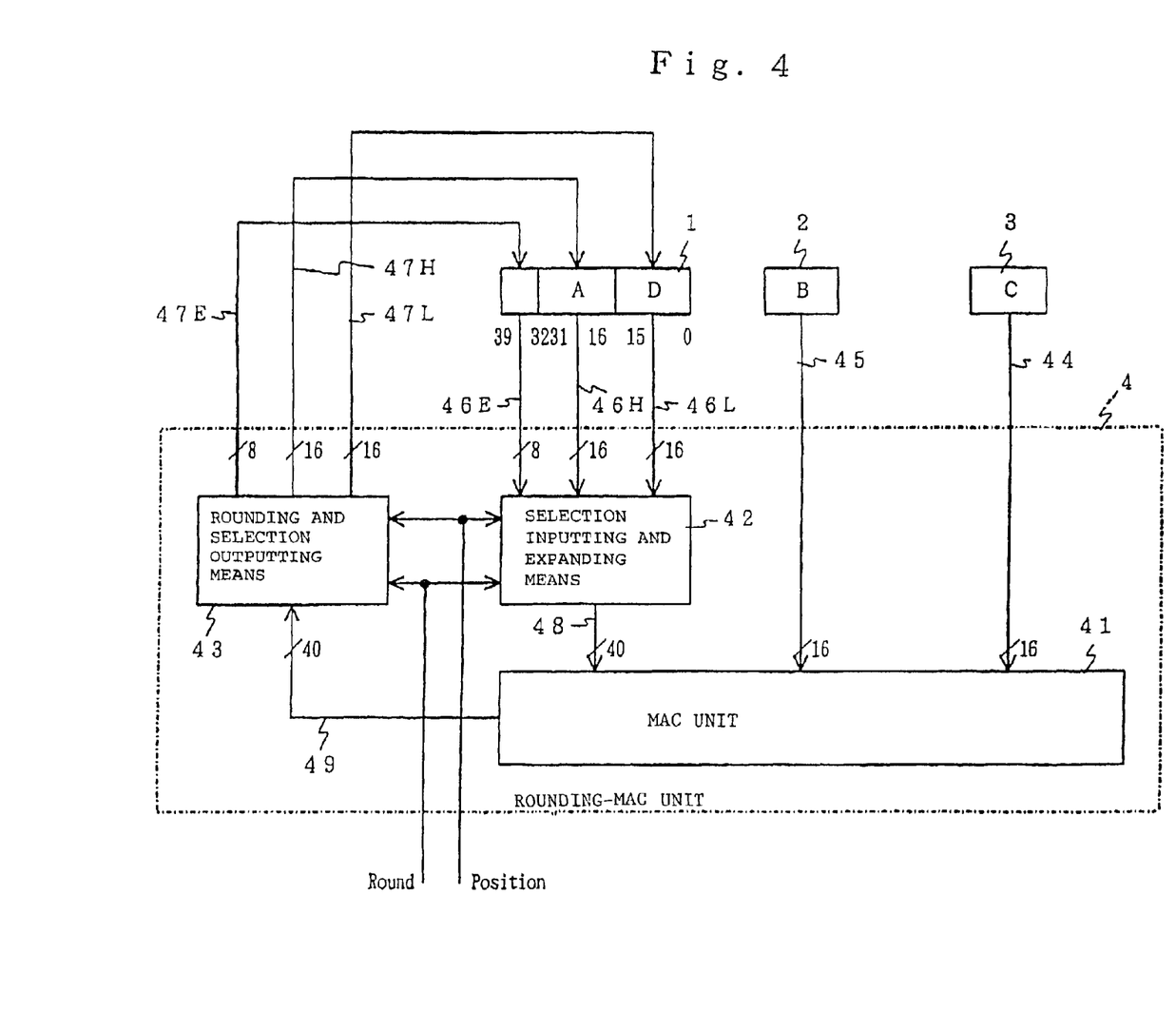
FIG. 4 is a block diagram of an arrangement based on an embodiment of the present invention.

Embodiments of the present invention are described below with reference to the drawings. FIG. 4 is a block diagram showing an arrangement based on an embodiment of the present invention. In FIG. 4, Rounding-MAC unit 4 is arranged so as to be able to efficiently handle 16-bit addends. More specifically, Rounding-MAC unit 4 is arranged so as to be able to perform multiply-accumulate operations on each addend in register 1 without affecting each other, where the register is 32-bit wide or more and two separate 16-bit addends are placed in the register.

Rounding-MAC unit 4 operates with registers connected thereto, and reads three data, i.e., an addend, a multiplicand, and a multiplier from the registers. Rounding-MAC unit 4 has three outputs as the results of operations. Operations performed by Rounding-MAC unit 4 are controlled by two kinds of signals Round, Position.

An addend is stored in either 31st–16th bits or 15th–0th bits of 40-bit register 1 that is connected to Rounding-MAC unit 4. A multiplicand and a multiplier are stored in other registers, and entered into Rounding-MAC unit 4.

FIG. 4 shows 40-bit register 1 which stores an addend, but does not show registers which store the a multiplicand and a multiplier. Data stored in 15th–0th bits of 40-bit register 1, data stored in 31st–16th bits thereof, and data stored in 39th–32nd bits thereof are entered respectively as input data 46L, input data 46H, and input data 46E into MAC unit 4. The multiplicand is entered as 16-bit data 45 into MAC unit 4, and the multiplier is entered as 16-bit data 44 into MAC unit 4.

Data 46L stored in 15th–0th bits of 40-bit register 1, data 46H stored in 31st–16th bits thereof, and data 46E stored in 39th–32nd bits thereof are entered as addends or parts of an addend into Rounding-MAC unit 4. Multiplicand 45 and multiplier 44 are entered into Rounding-MAC unit 4.

The result of a multiply-accumulate operation and a rounding process with an addend, a multiplicand, and a multiplier are written back as outputs 47L, 47H, 47E, respectively, into 40-bit register 1. Outputs 47L, 47H are represented as 16-bit data, and output 47E is represented as 8-bit data. Output 47L is output to 15th–0th bits of 40-bit register 1. Output 47H is output to 31st–16th bits of 40-bit register 1. Output 47E is output to 39th–32nd bits of 40-bit register 1.

As described above, operations performed by Rounding-MAC unit 4 are controlled by two control signals Round, Position. Control signal Position is a signal to indicate the position of an addend in 40-bit register 1. If a desired addend is placed in 31st–16th bits of 40-bit register 1, then control signal Position should be set to "1", and if a desired addend is placed in 15th–0th bits of 40-bit register 1, then control signal Position should be set to "0".

Control signal Round is a signal to indicate whether Rounding-MAC unit 4 is to perform a rounding process or not. The rounding process is a process for converting data of a larger data size to data of a smaller data size (e.g. 32-bit data to 16-bit data). A reverse process, i.e., a process for converting data of a smaller data size to data of a larger data size, is referred to as an expanding process. If the rounding process is to be carried out, then control signal Round is set to "1", and the rounding process is not to be carried out, then control signal Round is set to "0".

Let us describe an internal arrangement of Rounding-MAC unit 4 shown in FIG. 4. Rounding-MAC unit 4 comprises MAC unit 41, selection inputting and expanding means 42, and rounding and selection outputting means 43.

Selection inputting and expanding means 42 selects data from input data 46E, 46H, 46L in register 1, expands the selected data, and outputs 40-bit data. Selection inputting and expanding means 42 is controlled by control signals Position, Round. MAC unit 41 performs a multiply-accumulate operation on multiplier 44, multiplicand 45, and addend produced by selection inputting and expanding means 42.

Rounding and selection outputting means 43 rounds off an output, which is generated by MAC unit 41, from 40 bits into 16 bits, and outputs the 16-bit data to a designated position in 40-bit register 1. Rounding and selection outputting means 43 is controlled by control signals Position, Round.

Rounding-MAC unit 4 based on the present embodiment is a combination of MAC unit 41, selection inputting and expanding means 42, and rounding and selection outputting means 43 for improving the handling of 16-bit data.

Let us describe behavior of Rounding-MAC unit 4 based on the present embodiment with reference to FIG. 4. Selection inputting and expanding means 42 produces 40-bit data 48 based on input data 46E, 46H, 46L entered from 40-bit register 1 under the control of control signals Round, Position.

If control signal Round is "0", no rounding process is performed. Rounding-MAC unit 4 has to behave as if it was the conventional MAC unit. At this time, selection inputting and expanding means 42 outputs input data 46E, 46H, 46L entered from 40-bit register 1 as one 40-bit data, unchanged, to MAC unit 41.

If control signal Round is "1", then Rounding-MAC unit 4 operates differently depending on control signal Position. If control signal Round is "1" and control signal Position is "0", then selection inputting and expanding means 42 works on the assumption that the addend is placed in 15th–0th bits of 40-bit register 1. In this case, selection inputting and expanding means 42 expands the addend 46L from 15th–0th bits of 40-bit register 1 into 40-bit data and outputs the 40-bit data to MAC unit 41.

If control signal Round is "1" and control signal Position is "1", then Rounding-MAC unit 4 selection inputting and expanding means 42 works on the assumption that the addend is placed in the 31st–16th bits of 40-bit register 1. In this case, selection inputting and expanding means 42 expands the addend 46H from 31st–16th bits of 40-bit register 1 into 40-bit data and outputs the 40-bit data to MAC unit 41.

MAC unit 41 calculates a product of 16-bit data 44, 45, adds the product to 40-bit data 48, and outputs the sum as 40-bit data 49. Finally, rounding and selection outputting means 43 rounds off 40-bit data 49 representing the result of the multiply-accumulate operation performed by MAC unit 41, and outputs the rounded result as 16-bit data to 40-bit register 1. Rounding and selection outputting means 43 determines whether to round off 40-bit data 49 or not, based on control signal Round. Rounding and selection outputting means 43 determines which bit position of 40-bit register 1 to output the rounded 16-bit data to, based on control signal Position. If control signal Round is "0", then rounding and selection outputting means 43 does not round off 40-bit data 49, but divides 40-bit data 49 into outputs 47E, 47H, 47L and output them to 40-bit register 1.

If control signal Round is "1" and control signal Position is "0", since the added is placed in 15th–0th bits of 40-bit register 1, rounding and selection outputting means 43 rounds off 40-bit data 49 into 16-bit data, and outputs the 16-bit data as output 47L to 15th–0th bits of 40-bit register 1. At this time, since outputs 47H, 47E are not operated upon, the data in 39th–16th bits of 40-bit register 1 is not changed.

If control signal Round is "1" and control signal Position is "1", since the added is placed in 31st–16th bits of 40-bit register 1, rounding and selection outputting means 43 rounds 40-bit data 49 into 16-bit data, and outputs the 16-bit data as output 47H to 31st–16th bits of 40-bit register 1. At this time, since outputs 47L, 47E are not operated upon, the data in 39th–32nd bits and 15th–0th bits of 40-bit register 1 are not changed.

Figure 5:
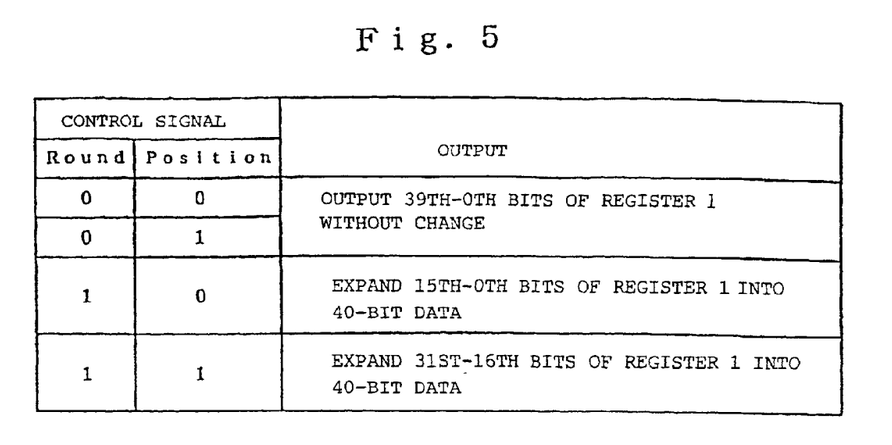
FIG. 5 is a diagram showing the manner in which a selection inputting and expanding means in FIG. 4 operates.

FIG. 5 shows the manner in which selection inputting and expanding means 42 shown in FIG. 4 operates. Let us describe behavior of selection inputting and expanding means 42 with reference to FIG. 5. Selection inputting and expanding means 42 serves the purpose of generating 40-bit data from 40-bit register 1 in view of whether data should be rounded off or not and the position in 40-bit register 1 of the added required in the multiply-accumulate operation.

Whether data should be rounded off or not by selection inputting and expanding means 42 is determined by control signal Round, and the position in 40-bit register 1 of the added is determined by control signal Position.

For example, if control signal Round is "0", then selection inputting and expanding means 42 produces 40-bit data 48 from input data 46E, 46H, 46L entered from 40-bit register 1 and outputs 40-bit data 48 regardless of control signal Position. In this case, 16-bit data 46L is represented as 15th–0th bits of 40-bit data 48, 16-bit data 46H as 31st–16th bits of 40-bit data 48, and 8-bit data 46E as 39th–32nd bits of 40-bit data 48, respectively.

If control signal Round is "1", then selection inputting and expanding means 42 operates differently depending on control signal Position. If control signal Round is "1" and control signal Position is "0", the addend is placed in 15th–0th bits of 40-bit register 1. Selection inputting and expanding means 42 expands 16-bit data 46L from 15th–0th bits of 40-bit register 1 into 40-bit data 48.

If control signal Round is "1" and control signal Position is "1", the addend is placed in 31st–16th bits of 40-bit register 1. Selection inputting and expanding means 42 expands 16-bit data 46H from 31st–16th bits of 40-bit register 1 into 40-bit data 48.

If selection inputting and expanding means 42 handles fixed-point numerical data, then selection inputting and expanding means 42 expands 16-bit data 46L or 16-bit data 46H into 40-bit data 48 as follows: First, selection inputting and expanding means 42 places 16-bit data to be expanded into 31st–16th bits of 40-bit data 48.

Then, selection inputting and expanding means 42 extracts a sign bit of 16-bit data to be expanded, and places the sign bit into 39th–32nd bits of 40-bit data 48. Because the sign bit is usually represented as 1-bit information, the sign bit is repeatedly inserted into 39th–32nd bits of 40-bit data 48. Finally, selection inputting and expanding means 42 inserts "0" into 15th–0th bits of 40-bit data 48.

Figure 6:
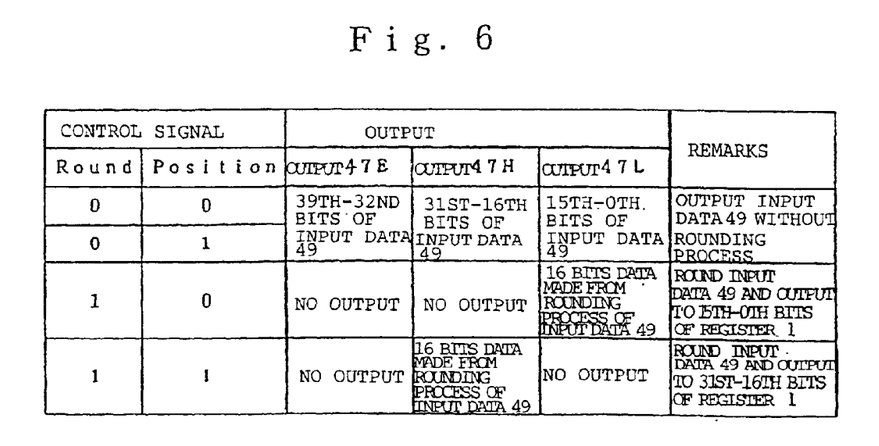
FIG. 6 is a diagram showing the manner in which a rounding and selection outputting means in FIG. 4 operates.

FIG. 6 shows the manner in which rounding and selection outputting means 43 shown in FIG. 4 operates. Let us describe behavior of rounding and selection outputting means 43 with reference to FIG. 6. Rounding and selection outputting means 43 is supplied with the result 49 of the multiply-accumulate operation performed by MAC unit 41.

Rounding and selection outputting means 43 serves the purpose of outputting entered 40-bit data 49 to 40-bit register 1 in view of whether data should be rounded off or not and the position in 40-bit register 1 of the added used in the multiply-accumulate operation.

Whether data should be rounded off or not by rounding and selection outputting means 43 is determined by control signal Round, and the position in 40-bit register 1 of the added is determined by control signal Position.

For example, if control signal Round is "0", then rounding and selection outputting means 43 does not round off 40-bit data 49, but outputs 40-bit data 49, unchanged, to 40-bit register 1.

At this time, output 16-bit data 47L is represented as 15th–0th bits of 40-bit data 49, 16-bit data 47H as 31st–16th bits of 40-bit data 49, and output 8-bit data 47E as 39th–32nd bits of 40-bit data 49.

If control signal Round is "1", then rounding and selection outputting means 43 operates differently depending on control signal Position. If control signal Round is "1" and control signal Position is "0", the addend is placed in 15th–0th bits of 40-bit register 1. Rounding and selection outputting means 43 rounds off 40-bit data 49 into 16-bit data, and outputs the 16-bit data as output 47L to the 15th–0th bits of 40-bit register 1. At this time, outputs 47H, 47E are not output.

If control signal Round is "1" and control signal Position is "1", the addend is placed in 31st–16th bits of 40-bit register 1. Rounding and selection outputting means 43 rounds off input 40-bit data 49 into 16-bit data, and outputs the 16-bit data as output 47H to 31st–16th bits of 40-bit register 1. At this time, outputs 47L, 47E are not output.

The present embodiment may be modified to change the register width and the data size for allowing M-bit registers to handle N-bit data where N and M are integer numbers and N≦M/2. According to the modification, register 1 comprises M-bit register, each of data 2, 4, 44, 45, 46H, 46L, 47H, 47L comprises N-bit data, each of data 46E, 47E comprises (M−2N)-bit data, and each of data 48, 49 comprises M-bit data.

MAC unit 41 calculates a product of N-bit data 44, 45, adds the product to M-bit data 48 received from selection inputting and expanding means 42. Sum 49 calculated by MAC unit 41 is rounded off by rounding and selection outputting means 43, which writes N-bit data back into register 1. FIGS. 5 and 6 show behavior of selection inputting and expanding means 42 and rounding and selection outputting means 43. Note that the number 39 in those figures to indicate a bit position is replaced with M−1, 32 with 2N, 31 with 2N−1, 16 with N, and 15 with N−1, respectively. If M=2N, then input 46E and output 47E are not required.

Figure 7:
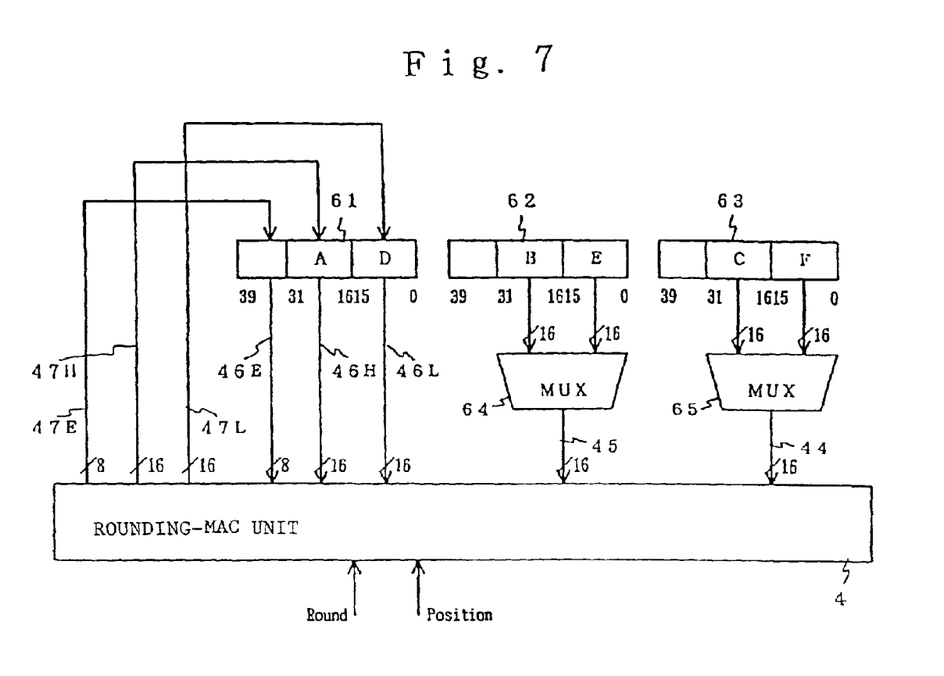
FIG. 7 is a block diagram of a multiply-accumulate unit with a rounding function based on an embodiment of the present invention.

FIG. 7 shows a block diagram showing the multiply-accumulate unit with the rounding function based on the present embodiment and three registers connected to the unit. In FIG. 7, 40-bit registers 61, 62, 63 are connected to Rounding-MAC unit 4, and 31st–16th bits or 15th–0th bits of registers 62, 63 are selected by MUXs (multiplexers) 64, 65 and entered to Rounding-MAC unit 4. In FIG. 7, registers 61, 62, 63 are arranged to read data from memory (not shown) and save data in memory.

Figure 8:
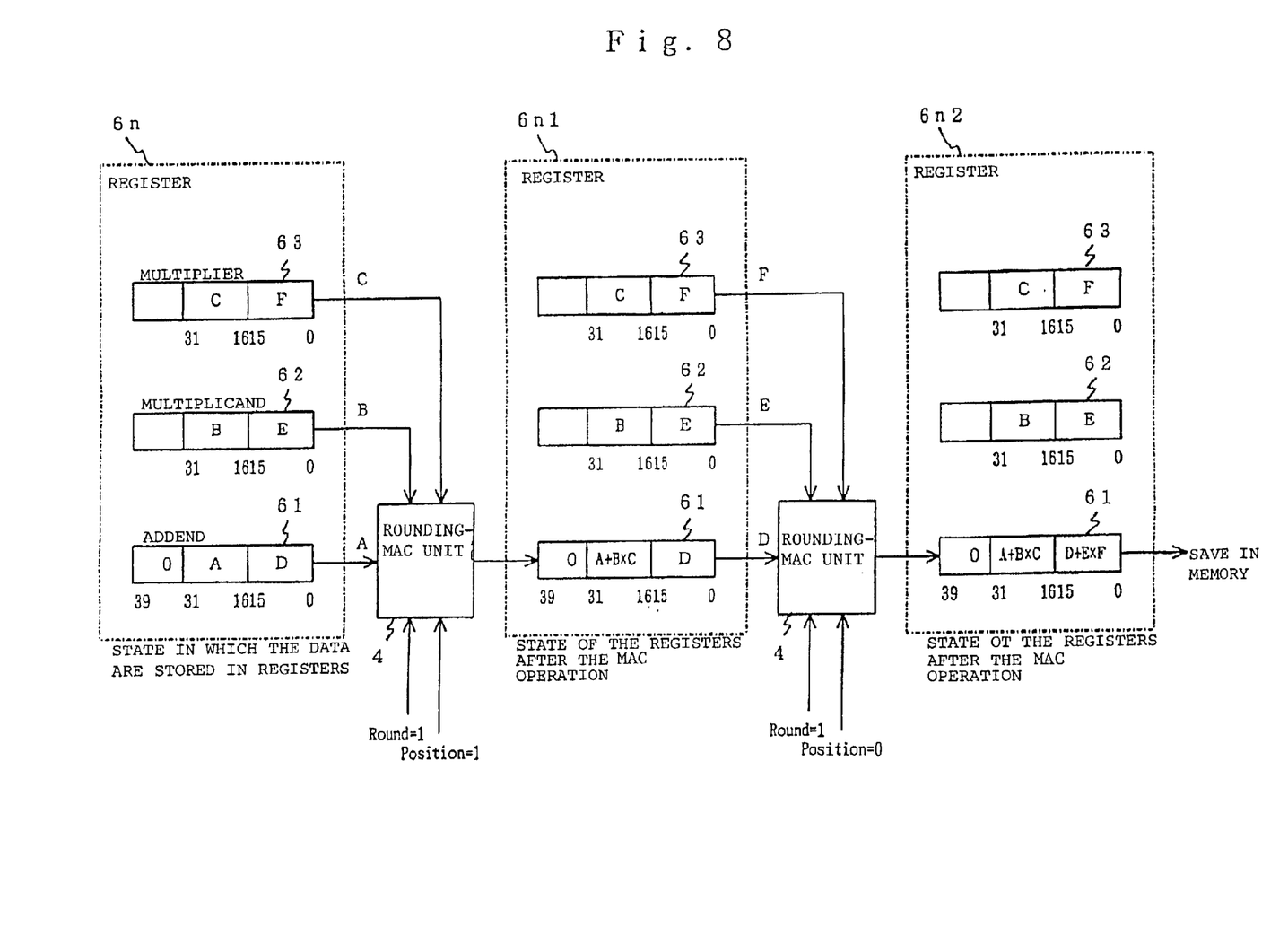
FIG. 8 is a block diagram showing registers states in a sequence of performing a multiply-accumulate operation on an addend, a multiplicand, and a multiplier, each of 16-bit data, with the multiply-accumulate unit with a rounding function shown in FIG. 7.

FIG. 8 shows register states in a sequence of performing a multiply-accumulate operation on an addend, a multiplicand, and a multiplier, each of 16-bit data, with Rounding-MAC unit 4 shown in FIG. 7. Let us describe behavior of Rounding-MAC unit 4 with reference to FIGS. 7 and 8.

In those figures, it is assumed that 16-bit data A, D are read from memory into register 61, and that addend A is stored in 31st–16th bits of register 61, another addend D in 15th–0th bits of register 61, respectively.

In this state referred to as state 6n1 in FIG. 8, a multiply-accumulate operation represented by A+B×C is carried out. At this time, control signal Round and control signal Position that are supplied to Rounding-MAC unit 4 are "1" and "0", respectively.

Rounding-MAC unit 4 reads addend A from register 61, performs a multiply-accumulate operation on added A, multiplicand B selected from register 62 by MUX 64, and multiplier C selected from register 63 by MUX 65, and rounds off the result of the multiply-accumulate operation. The rounded result is written back into register 61. At this time, the result is written in 31st–16th bits of register 61, whereas data in 15th–0th bits of register 61 remains unchanged. This state is referred to as state 6n2 in FIG. 8.

Register 61 in state 6n2 stores, respectively in 31st–16th bits and 15th–0th bits thereof, the results of these operations A+B×C, D+E×F as they have been rounded off into 16-bit data. These data can directly be stored in memory.

In FIG. 7, register 61 is fixedly combined with data 46L, 46H, 46E, 47E, 47H, 47L, register 62 with multiplicand 16-bit data 45 via MUX 64, and register 63 with multiplier 16-bit data 44 via MUX 65. However, the overall arrangement may be modified to freely select these combinations.

Such a modification is particularly effective for using Rounding-MAC unit 4 in a signal processor having a plurality of registers. It is also possible to use Rounding-MAC unit 4 as a circuit that is not included in a signal processor.

Use of Rounding-MAC unit 4 makes it possible to perform a multiply-accumulate operation on a 16-bit addend placed in 31st–16th bits or 15th–0th bits of a register, without affecting other bits, as shown in FIG. 8. This allows different 16-bit addends to be placed together in the register, resulting in reduction of the number of registers used for multiply-accumulate operations.

If Rounding-MAC unit 4 is incorporated in a signal processor having 32-bit registers or more, then it is possible for Rounding-MAC unit 4 to perform multiply-accumulate operations properly even when it simultaneously reads two 16-bit addends from memory and places them together in one register. Consequently, the 32-bit data transfer capability for data transfer between memory and registers can be used to its full advantage.

Let us consider the above advantages with respect to an actual application of an LMS (Least Mean Square) adaptive filter. The LMS adaptive filter serves to adaptively update FIR (Finite Impulse Response) filter coefficients based on a gradient method according to an error $e_i$ between an output $y_i$ from an FIR filter (coefficients $w_j$(j=0, 1, . . . , T−1))with T taps where xi represents an input signal at time index i, $d_i$ represents a desired signal. The output $y_i$ is calculated and coefficients $w_j$ are updated according to the following equations:

$$y_i = \Sigma x_{i-j} \cdot w_j \quad (2)$$

$$e_i = d_i - y_i \quad (3)$$

$$w_j = w_j + \mu \, e_i \cdot x_{i-j} \quad (4)$$

where Σ represents the sum from j=0 to j=T−1, μ represents a very small positive constant, and j=0, 1, . . . , T−1.

Referring to the equation (4), once $\mu \, e_i$ is calculated, the same value thereof can be used with respect to all the coefficients. Therefore, a basic process required for updating each of the filter coefficients represented by the equation (4) comprises the following four steps of:

(1) reading $x_{i-j}$ from memory;

(2) reading $w_j$ from memory;

(3) performing multiply-accumulate operation on addend $w_j$, multiplicand $\mu \, e_i$, and multiplier $x_{i-j}$ as follows:

$$w_j = w_j + \mu \, e_i \cdot x_{i-j}; \text{ and}$$

(4) saving $w_j$ in memory.

When the above four steps are carried out on fixed-point signal processors, each of $x_{i-j}, w_j, e_i$ is usually represented as 16-bit data, and $y_i$ is usually represented as 32-bit data or more. The data size is required by specifications of a multiply-accumulate unit incorporated in signal processors. With $x_{i-j}, w_j, e_i, y_i$ being of the above data sizes, the multiply-accumulate operation performed in the step (3) is an operation where all the data are 16-bit wide.

In the above basic steps, since the data transfer between registers and memory in the steps (1), (2), and (4) is 16-bit transfer operations, a signal processor having 32-bit data buses is capable of simultaneously transferring two 16-bit data with one load instruction.

If the 32-bit data transfer capability is used to read $w_j$ in the step (2), then two 16-bit data, $w_j$, $w_{j+1}$ are placed in 31st–16th bits and 15th–0th bits of one register, respectively. A processor with the conventional multiply-accumulate unit is unable to perform a multiply-accumulate operation on $w_j$, $w_j$ in one register thus placed as it is. However, the signal processor which incorporates Rounding-MAC unit 4 based on the present embodiment can immediately perform the multiply-accumulate operation on $w_j$, $w_{j-1}$ thus stored. As a result, the 32-bit data transfer capability can be used to save $w_j$, $w_{j+1}$ in memory in the step (4) immediately after the multiply-accumulate operation.

As described above, when the signal processor having 32-bit data buses performs a multiply-accumulate operation on 16-bit data, its 32-bit data transfer capability to transfer data between memory and registers can be used to its full advantage due to Rounding-MAC unit 4.

What is claimed is:

1. A signal processor comprising:
a number of registers for storing data; and
a multiply-accumulate unit with a rounding function, said multiply-accumulate unit with the rounding function comprising a multiply-accumulate unit for performing a multiply-accumulate operation on an addend placed in one of said registers, a multiplicand placed in one of said registers, and a multiplier placed in one of said registers, selecting inputting means for entering an addend supplied selectively from different positions in one of said registers which are connected thereto, rounding means for performing a rounding process to convert data of a larger data size into data of a smaller data size on the result of the multiply-accumulate operation based on the addend selectively entered by said selecting inputting means, and selection outputting means for outputting the result of the multiply-accumulate operation rounded off by said rounding means selectively to different positions in one of said registers.

2. The signal processor of claim 1, wherein said multiply-accumulate unit with the rounding function further comprises expanding means for performing an expanding process to convert data of a smaller data size into data of a larger data size on the addend selectively entered by said selecting inputting means, and entering the converted data into said multiply-accumulate unit.

3. The signal processor of claim 1, wherein said rounding means is arranged to perform said rounding process based on a rounding command supplied from an external source.

4. The signal processor of claim 1, wherein said selection inputting means is arranged to determine the position of data entered from one of said registers based on a position command supplied from an external source, and said selection outputting means is arranged to determine the position of data output to one of said registers based on said position command.

5. The signal processor of claim 1, wherein said register comprises a plurality of registers for holding data read from an external source.

6. The signal processor of claim 5, wherein said multiply-accumulate unit with the rounding function further comprises expanding means for performing an expanding process to convert data of a smaller data size into data of a larger data size on the addend selectively entered by said selecting inputting means, and entering the converted data into said multiply-accumulate unit.

7. The signal processor of claim 5, wherein said rounding means is arranged to perform said rounding process based on a rounding command supplied from an external source.

8. The signal processor of claim 5, wherein said selection inputting means is arranged to determine the position in said register of data entered from said register based on a position command supplied from an external source, and said selection outputting means is arranged to determine the position in said register of data output to said register based on said position command.

9. A multiply-accumulate unit with a rounding function, comprising:
a multiply-accumulate unit for performing a multiply-accumulate operation on an addend, a multiplicand, and a multiplier;
selecting inputting means for entering an addend supplied selectively from different positions in one of external registers;
rounding means for performing a rounding process to convert data of a larger data size into data of a smaller data size on the result of the multiply-accumulate operation based on the addend selectively entered by said selecting inputting means; and
selection outputting means for outputting the result of the multiply-accumulate operation rounded off by said rounding means selectively to different positions in one of said registers.

10. The multiply-accumulate unit with the rounding function of claim 9, further comprising:
expanding means for performing an expanding process to convert data of a smaller data size into data of a larger data size on the addend selectively entered by said selecting inputting means, and entering the converted data into said multiply-accumulate unit.

11. The multiply-accumulate unit with the rounding function of claim 9, wherein said rounding means is arranged to perform said rounding process based on a rounding command supplied from an external source.

12. The multiply-accumulate unit with the rounding function of claim 9, wherein said selection inputting means is arranged to determine the position of data entered from one of said registers based on a position command supplied from an external source, and said selection outputting means is arranged to determine the position of data output to one of external registers based on said position command.

13. The multiply-accumulate unit with a rounding function of claim 9, wherein said register comprises a plurality of registers for holding data read from an external source.

14. The multiply-accumulate unit with a rounding function of claim 13, wherein said multiply-accumulate unit with the rounding function further comprises expanding means for performing an expanding process to convert data of a smaller data size into data of a larger data size on the addend selectively entered by said selecting inputting means, and entering the converted data into said multiply-accumulate unit.

15. The multiply-accumulate unit with a rounding function of claim 13, wherein said rounding means is arranged to perform said rounding process based on a rounding command supplied from an external source.

16. The multiply-accumulate unit with a rounding function of claim 13, wherein said selection inputting means is arranged to determine the position in said register of data entered from said register based on a position command supplied from an external source, and said selection outputting means is arranged to determine the position in said register of data output to said register based on said position command.

* * * * *

UNITED STATES PATENT AND TRADEMARK OFFICE
CERTIFICATE OF CORRECTION

PATENT NO. : 6,792,442 B1
DATED : September 14, 2004
INVENTOR(S) : Takahiro Kumura It is certified that error appears in the above-identified patent and that said Letters Patent is hereby corrected as shown below:

<u>Title page,</u>
Item [*] Notice, please delete "This patent is subject to a terminal disclaimer"

Signed and Sealed this

Twelfth Day of July, 2005

JON W. DUDAS
*Director of the United States Patent and Trademark Office*